US008135958B2

(12) United States Patent
Greco et al.

(10) Patent No.: US 8,135,958 B2
(45) Date of Patent: Mar. 13, 2012

(54) METHOD, SYSTEM, AND APPARATUS FOR DYNAMICALLY VALIDATING A DATA ENCRYPTION OPERATION

(75) Inventors: Paul M. Greco, Tucson, AZ (US);
Melanie J. Sandberg, Tucson, AZ (US);
Scott J. Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1748 days.

(21) Appl. No.: 11/285,408

(22) Filed: Nov. 22, 2005

(65) Prior Publication Data

US 2007/0116266 A1    May 24, 2007

(51) Int. Cl.
*G06F 11/30* (2006.01)
(52) U.S. Cl. ............ 713/189; 713/150; 380/255; 726/1; 726/2; 726/22; 726/26
(58) Field of Classification Search .................. 713/150, 713/189; 726/1, 2, 22, 26; 380/255
See application file for complete search history.

(56) References Cited

U.S. PATENT DOCUMENTS

| 4,071,744 | A |   | 1/1978  | Pollock |         |
|-----------|---|---|---------|---------|---------|
| 5,161,193 | A |   | 11/1992 | Lampson et al. |  |
| 5,381,480 | A |   | 1/1995  | Butter et al. |    |
| 5,778,070 | A | * | 7/1998  | Mattison ....................... 713/191 |
| 5,915,022 | A |   | 6/1999  | Robinson et al. |  |
| 5,940,513 | A |   | 8/1999  | Aucsmith et al. |  |
| 5,991,402 | A |   | 11/1999 | Jia et al. |       |
| 6,345,359 | B1 |  | 2/2002  | Bianco |          |
| 6,424,715 | B1 |  | 7/2002  | Saito |           |
| 6,697,985 | B1 |  | 2/2004  | Ilani |           |
| 6,907,123 | B1 |  | 6/2005  | Schier |          |
| 6,963,976 | B1 |  | 11/2005 | Jutla |           |
| 2001/0033656 | A1 | * | 10/2001 | Gligor et al. ..................... 380/28 |
| 2002/0141585 | A1 |   | 10/2002 | Carr ............................. 380/255 |
| 2002/0181709 | A1 |   | 12/2002 | Sorimachi et al. ............ 380/265 |
| 2002/0188856 | A1 |   | 12/2002 | Worby |         |
| 2002/0191785 | A1 |   | 12/2002 | McBrearty et al. |        |
| 2002/0199094 | A1 | * | 12/2002 | Strand et al. ................... 713/150 |
| 2003/0108199 | A1 | * | 6/2003  | Pinder et al. .................. 380/200 |
| 2003/0126400 | A1 |   | 7/2003  | Debiez et al. |  |
| 2004/0223611 | A1 | * | 11/2004 | Yan et al. ......................... 380/37 |
| 2005/0060560 | A1 | * | 3/2005  | Sibert .......................... 713/193 |
| 2006/0098821 | A1 | * | 5/2006  | Tomiyasu ..................... 380/200 |

FOREIGN PATENT DOCUMENTS

| EP | 1538508 A1 | 6/2005 |
| JP | 2000231654 A | 8/2000 |
| JP | 2004362552 A | 11/2004 |
| WO | WO2005055020 A1 | 6/2005 |

* cited by examiner

*Primary Examiner* — Edan Orgad
*Assistant Examiner* — Roderick Tolentino
(74) *Attorney, Agent, or Firm* — Zilka-Kotab, PC

(57) ABSTRACT

A method, system, and apparatus for dynamically validating a data encryption operation are disclosed. In one embodiment, a method is provided which comprises decrypting a first sequential data element of a plurality of data elements substantially in parallel with the encryption of a second sequential data element of the plurality, where the first element comprises first data and first encryption validation metadata. In response to the decryption, second encryption validation metadata is generated utilizing the first data. Thereafter, a determination is made whether the first element has been validly encrypted based upon a comparison of the first and second metadata. In other embodiments, an encryption validation indicator may be generated (e.g., to notify a user of a detected encryption error and/or to mark a portion of data for re-encryption), further encryption operations may be suspended, and/or the storage of the first data element may be controlled following such a determination.

30 Claims, 4 Drawing Sheets

METHOD, SYSTEM, AND APPARATUS FOR DYNAMICALLY VALIDATING A DATA ENCRYPTION OPERATION

BACKGROUND

1. Technical Field

Embodiments of the present invention relate generally to data storage and security and more particularly to a method, system, and apparatus for dynamically validating a data encryption operation.

2. Description of the Related Art

As data processing systems have become more pervasive, the importance of maintaining the confidentiality, authenticity, and security of the data being processed has proportionately increased. Data encryption is one technique used to ensure the confidentiality of data stored in association with, or manipulated by conventional data processing systems. Using data encryption, the content of message data is obscured such that it is unreadable or decipherable until a reverse data decryption process is performed. While the basic premise remains essentially the same, the specific implementation of encryption can vary widely. For example, encryption may be performed using a code algorithm or process, which operates at the level of meaning (e.g., words or phrases) between users (e.g., message source and destination), using a cipher algorithm or process, manipulating a message at a structurally lower level (e.g., individual alphanumeric characters comprising the words or phrases of a message) or a combination thereof.

Encryption methods can also be divided into symmetric key and asymmetric key algorithms. In symmetric key algorithm encryption systems a message sender and receiver each have exclusive access to a securely-stored shared key. The message sender uses the common key for encryption, and the receiver uses the same key for decryption. In asymmetric key algorithm-based systems by contrast, there are two separate keys: a public key which is made publicly available and enables any sender to perform message data encryption and a related private key which is kept exclusively by the receiver for purposes of performing decryption on message data encrypted using the public key.

Still further distinctions among encryption systems or techniques may be made such as the format or granularity of the message data processed and/or whether additional functionality (e.g., authentication) is also provided. For example, encryption systems which operate on fixed sized data units or "blocks" of symbols or characters are characterized as "block" ciphers whereas those systems which are configured to operate on a continuous stream of data are characterized as "stream" ciphers.

In conventional systems, data produced by a data processing system may be encrypted in real-time as it is being provided to a data storage device, either at the host data processing system or utilizing hardware incorporated into the data storage device itself. Exemplary data storage devices may include the TotalStorage® 3592 Tape Drive Model J1A and/or Tape Controller Model J70 provided by International Business Machines Corporation of Armonk, N.Y. Using such systems and techniques, data may be streamed to/stored by a data storage device as described in an encrypted form with no additional buffering or noticeable transmission or storage latency such that the data is inaccessible by anyone without possession of an associated decryption key (e.g., anyone but the user or entity that generated or stored the data and/or a user designated by such a user).

While the described conventional data encryption and storage systems provide enhanced data security, they lack an elegant mechanism to ensure data integrity. Consequently, consistent or intermittent failures of encryption or related data storage hardware may result in the storage of corrupted data which may not be retrieved and correctly decrypted, even utilizing the proper decryption key, in some circumstances. Moreover, such corruption may not be discovered until part or all of the stored data is eventually read from the device within which it has been stored, at which point the original unencrypted data may have been discarded, rendering all the data stored irretrievable. Such data corruption and loss is particularly problematic with certain encryption techniques or modes of operation (e.g., cipher-block chaining, cipher feedback, output feedback, or the like) where encrypted output or ciphertext associated with one data block is used to encrypt one or more other blocks of data.

One known solution conventionally used to ensure the integrity of stored encrypted data is to read back each block of stored data as it is being encrypted and stored within an associated data storage device. In the majority of implementations however the latency associated with switching between "write" and "read" operations and manipulating a storage device in an appropriate manner such that the correct portion of data may be read in each instance is prohibitive

SUMMARY

A method, system, and apparatus for dynamically validating a data encryption operation are provided. According to one embodiment, a method is provided which comprises decrypting a first sequential data element of a plurality of data elements substantially in parallel with the encryption of a second sequential data element of the plurality, where the first sequential data element comprises first data and first encryption validation metadata. In response to the decryption, second encryption validation metadata is generated utilizing the first data. Thereafter, a determination is made whether the first sequential data element has been validly encrypted based upon a comparison of the first and second metadata. In other embodiments, an encryption validation indicator may be generated (e.g., to notify a user of a detected encryption error and/or to mark a portion of data for re-encryption), further encryption operations may be suspended, and/or the storage of the first sequential data element may be controlled following such a determination.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings indicates similar or identical items.

DETAILED DESCRIPTION OF AN ILLUSTRATIVE EMBODIMENT

Figure 1:
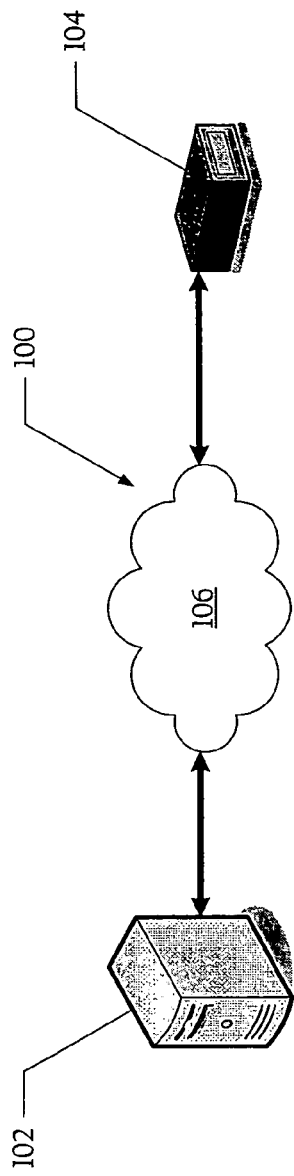
FIG. 1 illustrates a data storage system including a data storage device according to an embodiment of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method, system, and apparatus for dynamically validating a data encryption operation. According to one embodiment, a method is provided for validating an encryption operation (e.g., of message data including a plurality of data elements) in which a first sequential data element of the plurality of data elements is decrypted substantially in parallel with the encryption of a second sequential data element of the plurality of data elements. Within the present description, a sequential data element may comprise any component or unit storing, or otherwise specifying, message data having an associated sequence or order. For example, in one embodiment of the present invention, a "block" cipher is utilized and each sequential data element comprises a message "block". In other embodiments, data elements having any granularity or format may be utilized.

In addition to first (message) data, the described first sequential data element further comprises first encryption validation metadata. Encryption validation metadata may comprise any data or information capable of being utilized as described herein for the purpose of validating an encryption operation on (and consequently the retrievability of) of an associated data element or subcomponent (e.g., data) thereof. According to one embodiment, encryption validation metadata comprises a data value which may be computed or determined utilizing the data of an associated or corresponding sequential data element (e.g., block). Exemplary encryption validation metadata which may be utilized in various embodiments of the present invention include a checksum (e.g., parity bits, check digits, longitudinal redundancy check values, cyclic redundancy check values, vertical redundancy check values, or the like), hash function output (e.g., cryptographic message digest values, secure hash algorithm, or the like), error detection codes (e.g., Reed-Solomon codes or the like), authenticated encryption message authentication codes, or other similar data.

Once the described first sequential data element has been decrypted, second encryption validation metadata is generated utilizing the data element's first data and a determination is made whether the first sequential data element was validly encrypted based upon a comparison of the first encryption validation metadata and the second encryption validation metadata. If the data of the first sequential data element has not been modified prior or subsequent to a previous encryption operation, the first encryption validation metadata should be similarly unaltered and consequently the first and second encryption validation metadata values should be equal.

In another embodiment of the present invention an encryption validation indicator is generated following the previously-described encryption validation metadata comparison and corresponding validation determination. In various embodiments, such an indicator may take any of variety of forms. For example, an encryption validation indicator may comprise a signal or message transmitted to a user associated with a message including the first sequential data element and indicating that the entire message or specific data element being stored has been corrupted, that the encryption of the message or data element has failed or is invalid or alternatively may comprise metadata which "marks" or indicates the message as a whole or in part (e.g., a specific data element) is corrupt or invalid such that an active query or examination of such metadata would indicate that the message or data element, or an associated encryption operation is invalid. Conversely, in other alternative embodiments, such an encryption validation indicator may take the form or a message, signal or metadata positively indicating the validity of the message, data element, or encryption operation.

In still other embodiments of the present invention, such encryption validation indicator(s) may be utilized in a variety of ways. In one embodiment, an encryption validation indicator serves to "mark" or "flag" a message or component data element for re-encryption in an attempt to correct the previously-occurring encryption error. In other embodiments, actual storage of each component data element of a message within a destination storage device (e.g., a hard disk drive, tape drive, or the like) is not performed, completed/finalized, or validated if an associated encryption validation indicator indicates that an encryption error has occurred or such storage may alternatively be invalidated or the data erased from storage. In another embodiment, encryption operations may be suspended upon the detection or generation of an encryption validation indicator having a predetermined value. Consequently, data storage operations may be similarly suspended pending correction of the encryption operation error or data may be simply stored in an unencrypted (i.e., plaintext) format.

While encryption operations have been described thus far herein as single atomic operation, in other embodiments of the present invention a composite "encryption" operation may be implemented having a number of component operations. More specifically, encryption of a message comprising a plurality of sequential data elements may be performed utilizing a plurality of encoding operational stages. In one such embodiment, message data encryption comprises a first data compression stage (e.g., implementing a first, scheme1, embedded lossless data compression algorithm), a data encryption stage (e.g., implementing Galois/Counter Mode Authenticated Encryption), and a second data compression stage (e.g., implementing a first, scheme2, embedded lossless data compression algorithm) utilized to reorganize data generated by the described data encryption stage into a "compressed" format while reducing associated metadata which would otherwise be produced due to the random nature of the produced encrypted data. Consequently, the described "decryption" of a first sequential data element which is performed substantially in parallel with the encryption of subsequent second sequential data element may be performed utilizing either of at least two operational modes.

In the present description, Scheme1 compression (and decompression) is intended to indicate any of a number of compression or decompression schemes or algorithms which may be performed on data exhibiting a threshold level of regularity and therefore compressibility, such that the quantity of data generated by a compression operation is less than or equal to that to be compressed (and conversely that the quantity of data generated by a decompression operation is greater than or equal to that to be decompressed). Scheme2 compression (and decompression) by contrast, is intended to indicated a number of compression or decompression schemes or algorithms configured to be performed on data exhibiting a threshold level of irregularity or randomness, such that the application of conventional compression techniques actually expand the quantity of data processed. Scheme2 processing as utilized herein therefore serves to reformat data in order to reduce the amount of metadata/data overhead associated with the transmission or storage of data while preserving the format of traditional compression techniques or algorithms.

According to one embodiment a "short" operational mode is implemented in which, after each of the described encoding operational stages, an inverse or complement operation is immediately performed, encryption validation metadata is generated and compared with appropriate sequential data element's component encryption validation metadata, thus validating the encryption operation at an encoding operational stage level. In another embodiment, a "long" operational mode is implements in which "decryption" is performed at the conclusion of all stages by performing the inverse or complement of each encoding operational stage successively on the final "encrypted" output produced by the second compression stage and only generating encryption validation metadata for comparison once all complement operations have been performed. The described "long" operational mode confers an additional benefit, enabling errors/data corruption introduced into sequential data element data during transmission between encoding operational stages.

FIG. 1 illustrates a data storage system including a data storage device according to an embodiment of the present invention. Data storage system 100 or network (e.g., a SAN) of FIG. 1 is depicted as including a host data processing systems 102 and a data storage device 104 communicatively coupled with one another via a communication link 106 or medium. Within the embodiment of FIG. 1, host data processing system may comprise any data processing (e.g., computer) system to which disks, disk subsystems, or file servers may be attached and made accessible for data storage and I/O. Exemplary host data processing systems include mainframes, servers, workstations, and personal computers, as well as multiprocessors and clustered computer complexes.

Storage device 104 of the embodiment of FIG. 1 may include any device which may be utilized for the purpose of persistent data storage and delivery. For example, storage device 104 may comprises one or more disks, tapes, disk arrays, tape arrays, RAID array subsystems, robotic tape libraries, filers, and file servers, separately or in combination. While embodiments of the present invention are described herein in conjunction with data storage, alternative embodiments may be utilized to validate encryption operations outside of the storage context. For example, data encryption operations performed in combination with data communication may be validated utilizing one or more of the methods, systems, and/or apparatus according to embodiments of the present invention. Communication link 106 of the embodiment of FIG. 1 may include any of a number of communication media. In various embodiments of the present invention, communication link 106 may comprise one or more IDE, ATA, SATA, SCSI, iSCSI, PCI Express, Fibre Channel, FCIP, IPFC, iFCP, ESCON, and FICON links, LAN, MAN, WAN, and SAN segments and/or network element, fabrics, or the like.

Figure 2:
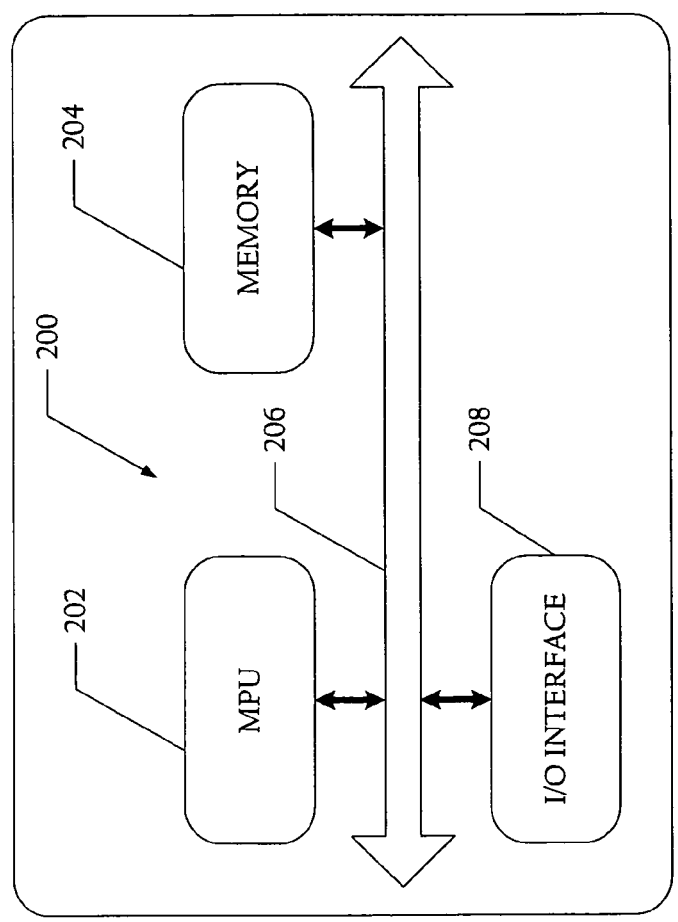
FIG. 2 illustrates a block diagram representation of a data processing system configured to stored data within a data storage device according to an embodiment of the present invention.

FIG. 2 illustrates a block diagram representation of a data processing system configured to stored data within a data storage device according to an embodiment of the present invention. While a particular number and arrangement of elements have been illustrated with respect to data processing system 200 of FIG. 2, it should be appreciated that embodiments of the present invention are not limited to data processing systems having any particular number, type, or arrangement of components and so many encompass a wide variety of data processing system types, architectures, and form factors (e.g., network elements or nodes, personal computers, workstations, servers, or the like). Data processing system 200 of the illustrated embodiment includes a processor 202 coupled to a memory 204 utilizing a bus 206. Memory 204 may comprise any of a number of system memory-type storage elements such as random access memory (RAM), read-only memory (ROM), flash memory, and cache.

Data processing system 200 of the illustrated embodiment further comprises an input/output (I/O) interface 208 coupled to bus 206 to communicatively couple one or more I/O devices (not shown) to data processing system 200. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, information processing hardware, and various processing operations further described herein. The features and process operations of the present invention may be implemented utilizing executable instructions embodied within a machine-readable medium such as memory 204, a storage device, a communication device or medium, or the like. A machine-readable medium may include any mechanism that provides (i.e., stores and/or transmits) data in a form readable by a machine (e.g., data processing system 200). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as processor 202, programmed with the instructions, to perform operations, methods or processes of the present invention. Alternatively, the features or operations of the present invention may be performed by specific hardware components that contain hardwired logic for performing the operations, or by any combination of programmed data processing components and custom hardware components.

Consequently, one or more methods, systems, or apparatuses as described herein may be implemented entirely within data processing system 200. In the described embodiment, for example, data processing system 200 may comprise one or more modules (not shown) each of which is implemented as software, system hardware, or a combination thereof in accordance with one or more embodiments described herein. For example, data processing system 200 may comprise a data storage module (e.g., a replication or backup module) which may be utilized in conjunction with I/O interface 208 to store data within an associated data storage device (e.g., data storage device 104 of FIG. 1), an encryption module to encrypt data to be stored, an encryption validation module to validate an encryption operation as described herein, and a control module coupled to one or more other modules (e.g., the data storage module and encryption module).

In another embodiment of the present invention, where encryption and validation operations are performed entirely within an associated data storage device (e.g., data storage device 104 of FIG. 1) or corresponding storage device controller with other (e.g., data storage) functionality being performed utilizing (host) data processing system 200, control functionality (e.g., as embodied within the previously-described control module) may be distributed between data processing system 200 and an associated data storage device. More specifically, a data storage module control interface may be provided (not shown) (e.g., embodied within a software module comprising executable instructions and stored within memory 204) which may be utilized to control data storage operations (e.g., to resend data to an associated data storage device which has been corrupted during encryption as indicated by a corresponding control module provided within the associated data storage device or elsewhere outside of data processing system 200). Alternatively or additionally, such a data storage module control interface may be utilized to indicate to one or more components or modules (e.g., the data storage module previously described) that an associated write or storage operation, database transaction or the like should not be finalized or "completed" (thereby enabling storage associated with data being written or stored to be reclaimed).

Figure 3:
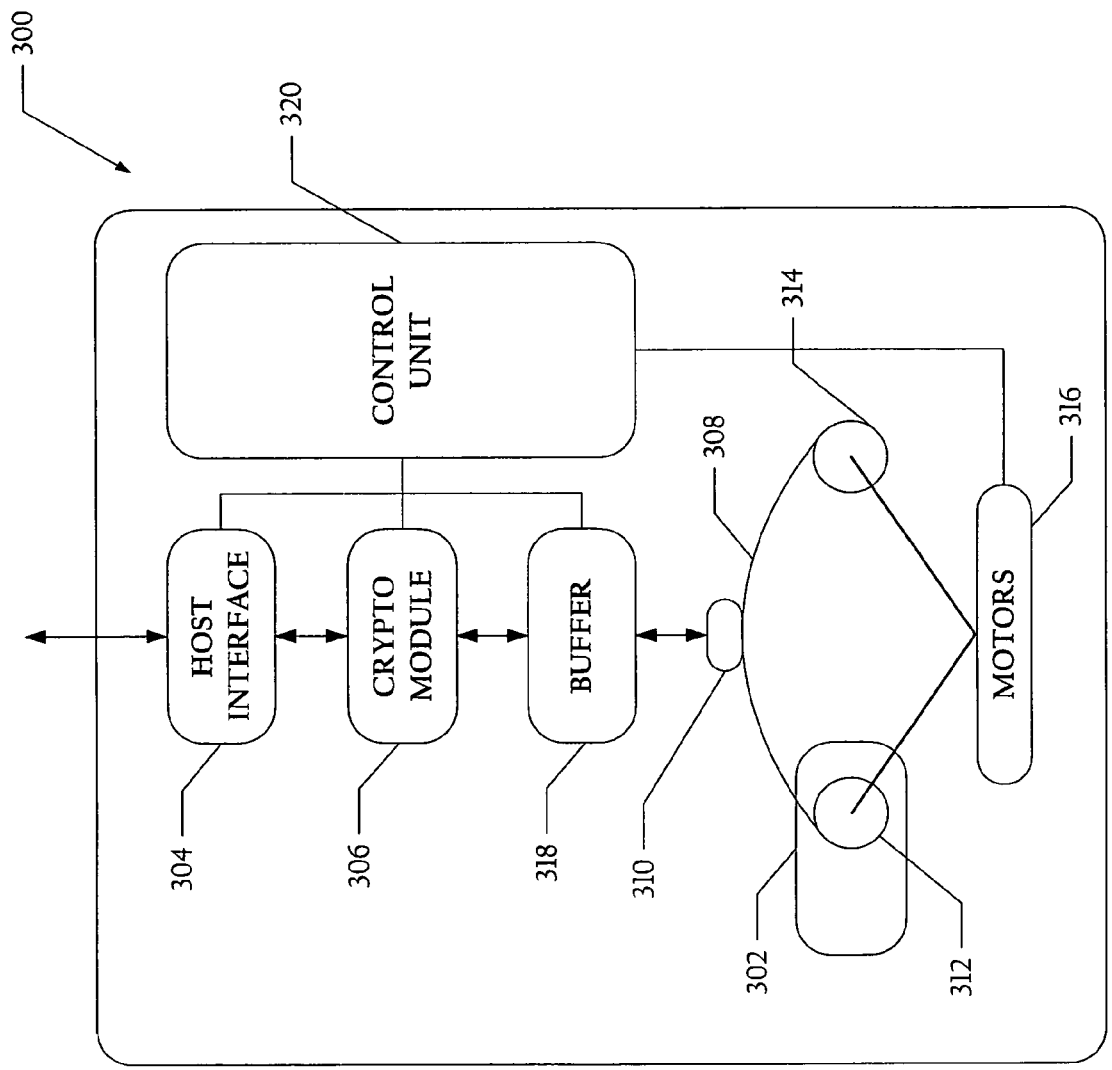
FIG. 3 illustrates a block diagram representation of a storage device according to an embodiment of the present invention.

FIG. 3 illustrates a block diagram representation of a storage device according to an embodiment of the present invention. In the embodiment of FIG. 3, data storage device 300 comprises a sequential access storage element including sequential access data storage media (e.g., data storage tape cartridge 302), a communication channel interface (e.g., host data processing system interface 304) to communicatively couple data storage device 300 to a host data processing system via a communication channel (e.g., communication link 106 of FIG. 1) and a cryptographic module 306 as depicted in greater detail in FIG. 4 and described more fully in the accompanying description thereto. In the illustrated embodiment of FIG. 3, cryptographic module 306 is configured to perform encryption operations (e.g., utilizing various encryption, encoding, and/or compression algorithms, or the like), decryption operations (e.g., utilizing various decryption, decoding, and/or decompression algorithms, or the like), as well as encryption validation operations as described herein.

Data storage device 300 of the illustrated embodiment further comprises tape data storage media 308 (e.g., magnetic tape) routed in proximity to a tape access (e.g., read/write) head 310 utilizing media transport reels 312 and 314 and one or more media transport motors 316 as shown. In the illustrated embodiment, tape access head 310 is configured to read data from and write data to tape data storage media 308 and to temporarily store or "stage" such data within a buffer 318 (e.g., one or more "read-ahead" or staging buffers). In the illustrated embodiment of FIG. 3, data storage device 300 further comprises a controller or control unit 320. In one embodiment, control unit 320 controls and manages data flow, formatting, and data storage subsystem operation via control signals issued to one or more of host data processing system interface 304, cryptographic module 306, buffer 318, and/or media transport motors 316 as shown. In another embodiment, functionality provided by cryptographic module 306 may be incorporated into or integrated with control unit 320.

Figure 4:
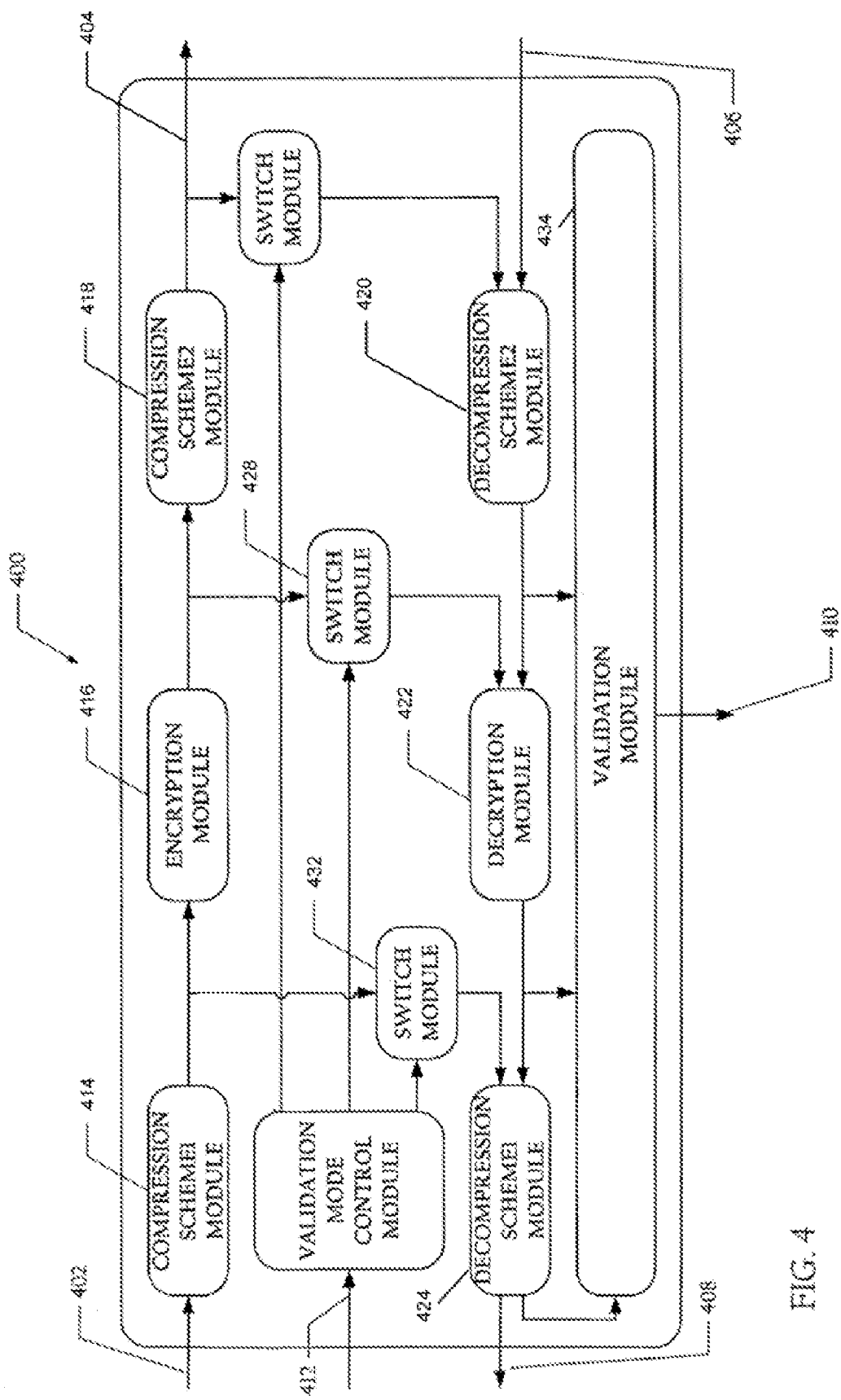
FIG. 4 illustrates a block diagram representation of a portion of a cryptographic module according to an embodiment of the present invention.

FIG. 4 illustrates a block diagram representation of a portion of a cryptographic module according to an embodiment of the present invention. Cryptographic module 400 of the embodiment of FIG. 4 includes a data element encryption input 402, a data element encryption output 404, a data element decryption input 406, a data element decryption output 408, and an encryption validation indicator output 410 as shown. In operation, data elements (e.g., message data blocks) are sequentially applied to or otherwise provided at data element encryption input 402 (e.g., in response to the initiation of a data storage device write or store operation) or alternatively (e.g., in response to the initiation of a data storage device read or load operation) at data element decryption input 406. After they have been received at cryptographic module 400, provided data elements are either encrypted or decrypted according to an associated sequence or order and provided as output data elements at either data element encryption output 404 or data element decryption output 408.

According to the illustrated embodiment depicted in FIG. 4, an encryption validation operation may be selectably performed in conjunction with the encryption of one or more data elements utilizing an encryption validation mode control input 412 as shown. In the illustrated embodiment, encryption validation mode control input 412 specifies whether encryption validation is to be performed, and if so, using which mode of operation (e.g., short or long operational mode).

Where no encryption validation operations are to be performed, data elements (e.g., blocks) are received in sequence at a first encoding operational stage (e.g., compression scheme1 module 414) via data element encryption input 402. The received data elements are then successively processed and passed on to the next encoding operational stage (e.g., encryption module 416 and compression scheme2 module 418) in sequence until all processing has been performed and the resultant (encrypted) data elements are provided as output of the last encoding operational stage (e.g., compression scheme2 module 418) via data element encryption output 404. For corresponding decoding/decryption (e.g., in response to the initiation of a data storage device read or load operation) encrypted data elements are similarly received at data element decryption input 406 and processed in sequence by successive decoding operational stages (e.g., decompression scheme2 module 420, decryption module 422, and decompression scheme1 module 424), being finally provided as decrypted data elements at data element decryption output 408.

If a control signal or data applied to encryption validation mode control input 412 specifies a short encryption validation operational mode is to be utilized, output from each encoding operational stage is applied to a corresponding decoding operational stage via an associated switch module as shown. More specifically, in the illustrated embodiment of FIG. 4, a control signal or data received by encryption validation mode control module 426 and specifying a short encryption validation operational mode causes encryption validation mode control module 426 to actuate each of switch modules 428-432, thus causing output of compression schemer module 414 to be applied to decompression scheme1 module 424, output of encryption module 416 to be applied to decryption module 422, and output of compression scheme2 module 418 to be applied to decompression scheme2 module 420. While illustrated within cryptographic module 400 herein, in alternative embodiments encryption validation mode control module 426 or its corresponding functionality may be implemented elsewhere (e.g., within control unit 320 of FIG. 3).

In the described "short operational mode" embodiment, the output of each of decompression scheme1 module 424, decryption module 422, and decompression scheme2 module 420 are applied to an encryption validation module 434 as they are produced as shown and processed to determine whether there are any errors present within the encoded data elements which may have been introduced by the encoding/encryption process. In the illustrated embodiment of the present invention, additional switch modules (not shown) are utilized such that all data elements which are dynamically decoded in the described manner are only applied to encryption validation module 434. Following the performance of such an encryption validation operation, an encryption validation indicator is provided at encryption validation indicator output 410.

Where a control signal or data applied to encryption validation mode control input 412 specifies a long encryption validation operational mode is to be utilized by contrast, only the appropriate switch modules (e.g., switch module 432) are actuated. For example, in the illustrated embodiment of FIG. 4, only the final encrypted data element output. More specifically, encrypted data element output of compression scheme2 module 418 is dynamically decrypted by being successively applied to each decoding operational stage (e.g., decompression scheme2 module 420, decryption module 422, and decompression scheme1 module 424) with the final decrypted output data element(s) being applied to encryption validation module 434. Utilizing the described "long" operational mode, data corruption occurring between encoding operational stages may be discovered in addition to corruption introduced due to a failure or error of one or more encryption/encoding process operations or modules.

Figure 5:
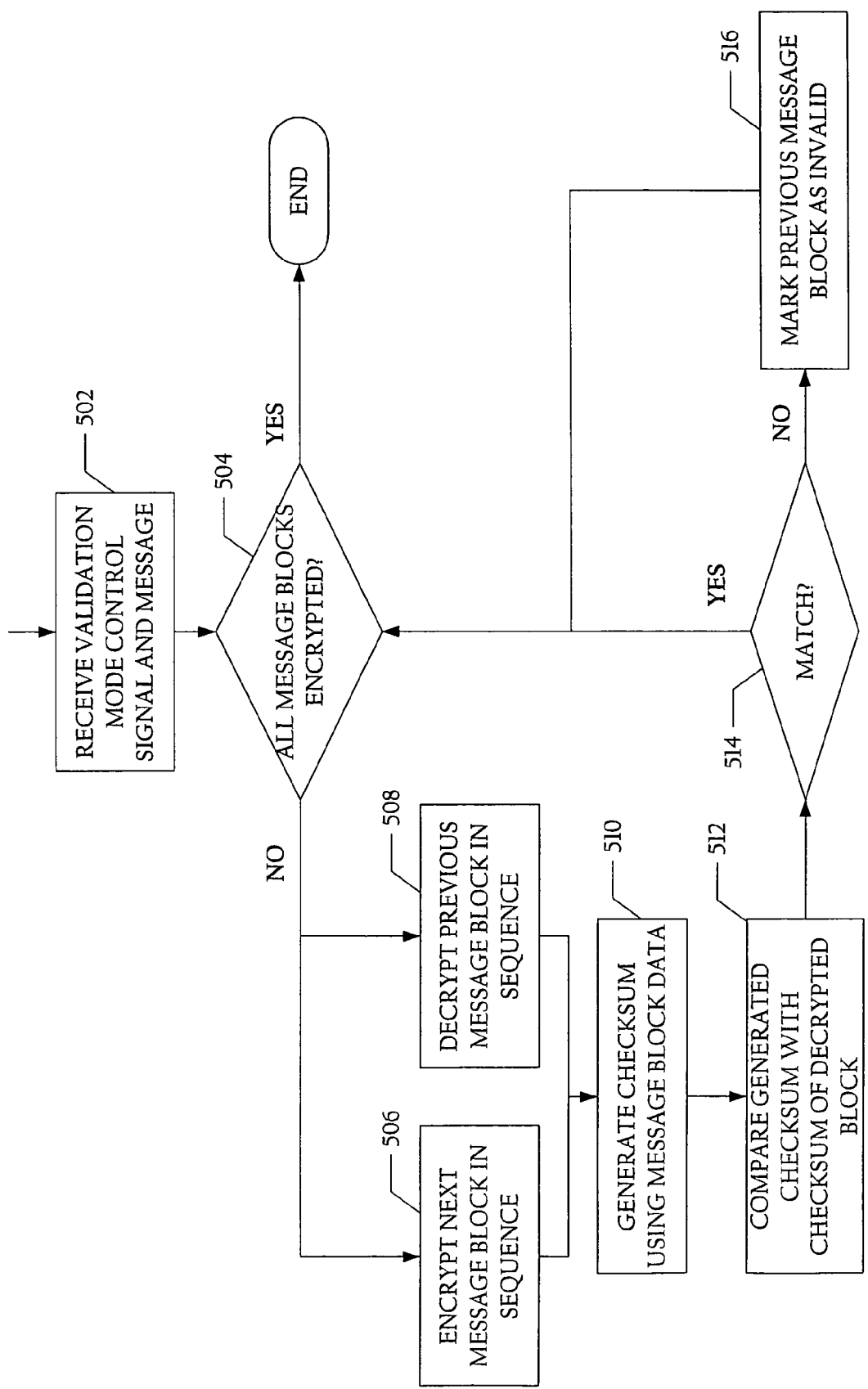
FIG. 5 illustrates a flow diagram of process to validate the encryption of message data according to an embodiment of the present invention.

FIG. 5 illustrates a flow diagram of process to validate the encryption of message data according to an embodiment of the present invention. For example, in one embodiment, the depicted process may be performed by cryptographic module 400 of FIG. 4. In the illustrated process embodiment, an encryption validation mode control signal and a data message comprising one or more blocks of message data or other data elements are initially received (process block 502). Thereafter, a determination is made whether all message blocks have been encrypted (process block 504).

If a determination is made that all message blocks have already been processed, the depicted process is terminated. Otherwise, the next message block in the message's sequence of blocks is encrypted while the previous message block in sequence is decrypted substantially in parallel (process blocks 506 and 508). While only message data blocks which are immediately adjacent to one another in sequence are shown as being processed in parallel in the embodiment of FIG. 5, in alternative embodiments of the present invention message data blocks or other data elements having any sequential relationship may be processed in parallel, so long as the message data block being decrypted does not occur subsequent to the message data block being encrypted in sequence and consequently that the message data block being decrypted has been previously encrypted.

Once decryption has occurred (process block 508), encryption validation metadata in the form of a checksum is generated using the decrypted message block data (process block 510). In alternative embodiments of the present invention, various other encryption validation metadata (e.g., hash function output, error detection codes, authenticated encryption message authentication codes, or the like) may be generated in place of or in addition to such a checksum. In the illustrated embodiment of FIG. 5, the generated checksum is then compared to another checksum stored within the decrypted message block data (process block 512).

Thereafter, a determination is made whether the generated checksum and decrypted checksum match (process block 514). If a determination is made that the decrypted and generated checksum values do not match, the "previous" data block which is being processed is marked as being invalid (process block 516). Subsequently, or following the determination of a match between generated and decrypted checksums, the illustrated process loops and another determination is made whether all data blocks of the message have been encrypted (process block 504) as shown. Although the flow diagram depicted in FIG. 5 indicates a particular order of operation and a specific granularity of process operations, in alternative embodiments the illustrated order may be varied (e.g., process operations may be performed in another order or performed substantially in parallel) and one or more of the process operations may be coalesced or fragmented. Similarly, addition process operations may be added where necessary in alternative embodiments of the present invention.

The present invention has been described in the context of fully functional data processing system; however, those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects. Consequently, the invention is intended to be limited only by the scope of the appended claims, giving full cognizance to equivalents in all respects.

What is claimed is:

1. A method of validating a data encryption operation, said method comprising:
   decrypting, using at least one processor, a first sequential data element of a plurality of data elements substantially in parallel with an encryption of a second sequential data element of said plurality of data elements, wherein said first sequential data element comprises first data and first encryption validation metadata;
   generating second encryption validation metadata utilizing said first data in response to said decrypting; and
   determining whether said first sequential data element was validly encrypted based upon a comparison of said first encryption validation metadata and said second encryption validation metadata.

2. The method of claim 1, further comprising:
   generating an encryption validation indicator in response to said determining.

3. The method of claim 2, further comprising:
   associating said encryption validation indicator with said first sequential data element in response to a determination that said first sequential data element was validly encrypted; and
   re-encrypting said first sequential data element in response to said associating.

4. The method of claim 1, further comprising:
   storing said first sequential data element within a storage device in response to a determination that said first sequential data element was validly encrypted.

5. The method of claim 1, further comprising:
   suspending encryption of said plurality of data elements in response to said determining.

6. The method of claim 1, wherein
   said method further comprises encrypting said first sequential data element utilizing a plurality of encoding operation stages, and
   each of said plurality of encoding operation stages is associated with a separate hardware element.

7. The method of claim 6, wherein said plurality of encoding stages comprises at least one of a data compression stage, a data encryption stage, and a scheme2 encoding stage.

8. The method of claim 1, wherein said first encryption validation metadata comprises a checksum value.

9. A non-transitory machine-readable physical medium having a plurality of instructions executable by a machine embodied therein, wherein said plurality of instructions when executed cause said machine to perform a method of validating a data encryption operation, said method comprising:
   decrypting a first sequential data element of a plurality of data elements substantially in parallel with an encryption of a second sequential data element of said plurality of data elements, wherein said first sequential data element comprises first data and first encryption validation metadata;
   generating second encryption validation metadata utilizing said first data in response to said decrypting; and
   determining whether said first sequential data element was validly encrypted based upon a comparison of said first encryption validation metadata and said second encryption validation metadata.

10. The machine-readable physical medium of claim 9, wherein said method further comprises:
    generating an encryption validation indicator in response to said determining.

11. The machine-readable physical medium of claim 10, wherein said method further comprises:
    associating said encryption validation indicator with said first sequential data element in response to a determination that said first sequential data element was validly encrypted; and
    re-encrypting said first sequential data element in response to said associating.

12. The machine-readable physical medium of claim 9, wherein said method further comprises:
    storing said first sequential data element within a storage device in response to a determination that said first sequential data element was validly encrypted.

13. The machine-readable physical medium of claim 9, wherein said method further comprises:
    suspending encryption of said plurality of data elements in response to said determining.

14. The machine-readable physical medium of claim 9, wherein
    said method further comprises encrypting said first sequential data element utilizing a plurality of encoding operation stages, and
    each of said plurality of encoding operation stages is associated with a separate hardware element.

15. The machine-readable physical medium of claim 14, wherein said plurality of encoding stages comprises at least one of a data compression stage, a data encryption stage, and a scheme2 encoding stage.

16. The machine-readable physical medium of claim 9, wherein said first encryption validation metadata comprises a checksum value.

17. An apparatus for validating a data encryption operation comprising:
    hardware, the hardware being for:
    decrypting a first sequential data element of a plurality of data elements substantially in parallel with an encryption of a second sequential data element of said plurality of data elements, wherein said first sequential data element comprises first data and first encryption validation metadata;
    generating second encryption validation metadata utilizing said first data in response to a decryption of said first sequential data element; and
    determining whether said first sequential data element was validly encrypted based upon a comparison of said first encryption validation metadata and said second encryption validation metadata.

18. The apparatus of claim 17, further comprising:
    hardware for generating an encryption validation indicator in response to a determination whether said first sequential data element was validly encrypted.

19. The apparatus of claim 18, further comprising:
    hardware for associating said encryption validation indicator with said first sequential data element in response to a determination that said first sequential data element was validly encrypted; and hardware for re-encrypting said first sequential data element in response to an association of said encryption validation indicator with said first sequential data element.

20. The apparatus of claim 17, further comprising:
hardware for storing said first sequential data element within a storage device in response to a determination that said first sequential data element was validly encrypted.

21. The apparatus of claim 17, further comprising:
hardware for suspending encryption of said plurality of data elements in response to a determination whether said first sequential data element was validly encrypted.

22. The apparatus of claim 17, wherein
said apparatus further comprises hardware for encrypting said first sequential data element utilizing a plurality of encoding operation stages, and
each of said plurality of encoding operation stages is associated with a separate hardware element.

23. The apparatus of claim 22, wherein said plurality of encoding stages comprises at least one of a data compression stage, a data encryption stage, and a scheme2 encoding stage.

24. The apparatus of claim 17, wherein said first encryption validation metadata comprises a checksum value.

25. A cryptographic module comprising:
an encryption module to encrypt a plurality of data elements, wherein
said plurality of data elements comprises a first sequential data element and second sequential data element, and
said first sequential data element comprises first data and first encryption validation metadata;
a decryption module, selectably coupled to said encryption module, to decrypt said first sequential data element substantially in parallel with an encryption of said second sequential data element; and
a encryption validation module to generate second encryption validation metadata utilizing said first data in response to a decryption of said first sequential data element, to compare said first encryption validation metadata and said second encryption validation metadata, and to generate an encryption validation indicator in response to a comparison of said first encryption validation metadata and said second encryption validation metadata,
wherein the cryptographic module is embodied in software on a non-transitory medium, in hardware, or in a combination thereof.

26. The cryptographic module of claim 25, wherein
said encryption validation module is configured to associate said encryption validation indicator with said first sequential data element in response to a comparison of said first encryption validation metadata and said second encryption validation metadata; and
said encryption module is configured to re-encrypt said first sequential data element in response to an association of said encryption validation indicator with said first sequential data element.

27. The cryptographic module of claim 25, wherein said encryption module is configured to suspend encryption of said plurality of data elements in response to a comparison of said first encryption validation metadata and said second encryption validation metadata.

28. The cryptographic module of claim 25, wherein said first encryption validation metadata comprises a checksum value.

29. The method of claim 1, further comprising: encoding each of the data elements prior to encrypting the data elements; receiving selection of an encryption validation operational mode, wherein a first encryption validation operational mode includes sequentially performing the decrypting of the first data element and then decoding the first data element, wherein a second encryption validation operational mode includes performing the decrypting of the first data element and decoding the first data element substantially in parallel.

30. The method of claim 29, wherein if it is determined that the first sequential data element was not validly encrypted, a write operation associated with the first sequential data element is cancelled, and further comprising encoding each of the data elements after encrypting the data elements using a second encoding scheme; wherein the first encryption validation operational mode includes sequentially decoding the first data element using a second decoding scheme, then performing the decrypting of the first data element, and then decoding the first data element using a first decoding scheme, wherein the another encryption validation operational mode includes performing the decrypting of the first data element, decoding the unencrypted first data element and decoding the encrypted first data element substantially in parallel.

* * * * *